3,004,082
Patented Oct. 10, 1961

3,004,082
ALKYLATION OF SATURATED HYDROCARBONS
Erwin E. Meisinger, Elmhurst, Ill., assignor to Universal Oil Products Company, Des Plaines, Ill., a corporation of Delaware
No Drawing. Filed Dec. 14, 1959, Ser. No. 859,148
20 Claims. (Cl. 260—666)

This invention relates to a process for the alkylation of saturated hydrocarbons in the presence of a novel catalyst. More particularly, this invention relates to the alkylation of an alkylatable saturated hydrocarbon with an olefin-acting compound at alkylation conditions in the presence of an alkylation catalyst comprising a mixture of a Friedel-Crafts metal halide and a copper base alloy comprising copper and a metal selected from the group consisting of zinc and tin.

An object of this invention is to produce alkylated saturated hydrocarbons and particularly to produce isoparaffin hydrocarbons. A specific object of this invention is to produce substantially saturated gasoline boiling-range hydrocarbons having high anti-knock values which may be utilized as components of gasoline suitable for use in airplane or automobile engines.

Numerous catalysts have been proposed for the alkylation of paraffin hydrocarbons with olefin-acting compounds including liquid catalysts such as sulfuric acid, hydrogen fluoride, etc. Similarly, solid catalyst such as aluminum chloride, aluminum bromide, metal oxides, metal sulfides, and clays have been proposed as catalysts for this reaction. Each of these prior art catalysts suffer from at least one inherent disadvantage, and it is a further object of this invention to provide an alkylation catalyst which overcomes each and all of such disadvantages. For example, the prior art teaches that the above-mentioned liquid catalysts are not satisfactory alkylation catalysts for the reaction of isobutane with ethylene. Sulfuric acid is not a satisfactory catalyst for the alkylation of isobutane with propylene. In addition, sulfuric acid has the inherent disadvantage that rapid deterioration of the catalyst takes place during use. Considerable sludge formation and undesirable side reactions occur when aluminum chloride alone is used as the catalyst for the alkylation reaction. Metal oxides, clays, etc., which are stable, solid catalysts can only be utilized at high temperatures and high pressures. The use of the novel catalyst of the present invention overcomes these and other disadvantages as will become evident in the following detailed specifications.

In its broadest aspect the present invention embodies a process for the alkylation of an alkylatable saturated hydrocarbon with an olefin-acting compound at alkylation conditions in the presence of a Friedel-Crafts metal halide and a copper base alloy comprising copper and a metal selected from the group consisting of zinc and tin.

Another embodiment relates to a process for the alkylation of isobutane with an olefin-acting compound at alkylation conditions in the presence of aluminum chloride and a copper base alloy comprising copper and zinc.

A further embodiment relates to a process for the alkylation of isobutane with an olefin-acting compound at alkylation conditions in the presence of aluminum chloride and a copper base alloy comprising copper and tin.

Still another embodiment relates to a process for the alkylation of isobutane with an olefin-acting compound at alkylation conditions in the presence of aluminum chloride and a brass support.

A still further embodiment relates to a process for the alkylation of isobutane with an olefin-acting compound at alkylation conditions in the presence of aluminum chloride and a bronze support.

A specific embodiment of this invention relates to a process for the alkylation of isobutane with ethylene at alkylation conditions in the presence of aluminum chloride and a brass support.

Another specific embodiment relates to a process for the alkylation of isobutane with propylene at alkylation conditions in the presence of aluminum chloride and a bronze support.

A still further specific embodiment of this invention relates to a process for the alkylation of isobutane with a butene at alkylation conditions in the presence of aluminum chloride and a brass support.

Other embodiments of the present invention will become apparent in considering the specification as hereinafter set forth.

It has been discovered that a catalyst composition useful for the alkylation of saturated hydrocarbons may be prepared by commingling a Friedel-Crafts metal halide and a copper base alloy comprising copper and a metal selected from the group consisting of zinc and tin. While the catalyst of the present invention includes a Friedel-Crafts metal halide, the catalyst possesses properties superior to those of a Friedel-Crafts metal halide alone under conditions of temperature, pressure, space velocity, etc., ordinarily used for a Friedel-Crafts metal halide. For example, sludge formation, which is a serious detriment to the commercial utilization of a Friedel-Crafts metal halide as a catalyst for the alkylation of saturated hydrocarbons, is minimized or negligible, or for all practical purposes eliminated by use of the mixed catalyst composition of the present invention. Furthermore, copper alloyed with a metal selected from the group consisting of zinc and tin is ordinarily considered to have little or no catalytic activity in the alkylation of saturated hydrocarbons under the conditions employed for a Friedel-Crafts metal halide catalyst. Thus an alloy comprising about 60% by weight copper and about 34% by weight zinc has little or no catalytic activity for the alkylation of isobutane with ethylene, propylene, or a butene under conditions normally utilized for such alkylation using aluminum chloride as the catalyst. It is therefore surprising that copper alloyed with a metal selected from the group consisting of the zinc and tin enhances the catalytic properties of a Friedel-Crafts metal halide under conditions normally utilized for Friedel-Crafts metal halide catalysts alone since such copper alloy itself exhibits substantially little or no catalytic activity at such conditions for said alkylation reaction. Furthermore, it has been suggested in the prior art to utilize certain porous materials and supports for Friedel-Crafts metal halides. Such porous supports all have relatively high surface areas and include alumina, clays, various naturally occurring silica-aluminas, etc. While Friedel-Crafts metal halides such as aluminum chloride can be supported on these porous materials to form solid supported metal halide catalysts the resultant catalysts have an unfortunate inherent disadvantage since these supports tend to adsorb sludge formed in the reaction resulting in an abbreviated catalyst life. Not only does this adsorption of sludge lead to catalyst deactivation, but it also apparently accelerates the formation of additional sludge. The catalyst compositions of the present invention do not suffer from this disadvantage and therefore are extremely desirable for use in continuous processes operating for extended periods of time.

As hereinbefore set forth, the novel catalyst for the alkylation of saturated hydrocarbons comprises a Friedel-Crafts metal halide and a copper base alloy comprising copper and a metal selected from the group consisting of zinc and tin. The Friedel-Crafts metal halide preferably comprises aluminum chloride. Other Friedel-Crafts metal halides utilizable as catalyst components within the scope of the present invention are aluminum bromide, zinc chloride, zirconium chloride, gallium chloride, titanium tetrachloride, ferric chloride, ferric bromide, antimony chloride, antimony bromide, bismuth chloride, and others which are well known to one skilled in the art.

The above described Friedel-Crafts metal halide is utilized in conjunction with a copper base alloy containing a metal selected from the group consisting of zinc and tin. The copper base alloy thus employed comprises about 60% to about 90% copper by weight. It is preferred to employ an alloy wherein the copper comprises about 70% to about 80% by weight of said alloy. The second major constituent of the copper base alloy, whether it be zinc or tin, is present in appreciable amounts say from about 10% to about 40% by weight and preferably from about 20% to about 35% of the total weight of said copper base alloy. It is further contemplated that other metals such as lead, aluminum, iron, phosphorus, manganese, etc., may be present in amounts up to about 5% by weight of the copper base alloy. As a matter of fact a suitable copper base alloy is a brass comprising 60.54% copper, 34.94% zinc, 0.7 tin, 3.15% lead.

The copper base alloy utilized as a support for the Friedel-Crafts metal halide can be in any form, being more effective in some forms than in others. For example, said copper base alloy can be in a particulate form, or in the form of shot, or formed as wire clippings, etc. However, excellent results have been achieved where said copper base alloy is in the form of metal turnings, particularly so where the surface of said metal turnings is in a roughened condition such as is caused by cutting brass on a lathe in such a manner as to provide lathe turning chips approximately 3/16" to 1/4" long.

The Friedel-Crafts metal halide can be impregnated on the copper base alloy in any conventional manner. For example, in one method aluminum chloride and brass particles are physically mixed by grinding together in a ball mill or other type of grinding apparatus under anhydrous conditions. In another method aluminum chloride and brass turnings are merely physically commingled by shaking together under anhydrous conditions. In a preferred method the Friedel-Crafts metal halide may be vaporized or sublimed onto the copper base alloy to form a solid catalytic mass. A further method comprises continuous addition of the Friedel-Crafts metal halide, for example dissolved in a stream of one or more of the reactants, such as aluminum chloride dissolved in isobutane, to a reactor containing a fixed bed of brass turnings which may or may not have previously had Friedel-Crafts metal halide admixed therewith or sublimed thereon.

In contrast to Friedel-Crafts metal halides, the catalysts of the present invention do not form substantial amounts of complexes with unsaturated hydrocarbons. Accordingly, they may be used in continuous processes over extended periods of time with relatively little contamination by such complexes so that in most instances the catalyst life is considerably in excess of that of the corresponding Friedel-Crafts metal halide in similar types of hydrocarbon conversion reactions.

As hereinbefore set forth, the novel catalyst of the present invention for the alkylation of saturated hydrocarbons comprises a Friedel-Crafts metal halide and a copper base alloy comprising copper and a metal selected from the group consisting of zinc and tin. The ratio of the Friedel-Crafts metal halide to the copper base alloy may vary over a relatively wide range. Thus, a catalyst is utilized wherein the Friedel-Crafts metal halide comprises from about 1% to about 50% of the total catalyst weight. Excellent results have been obtained by the utilization of a catalyst wherein the Friedel-Crafts metal halide, for example aluminum chloride, comprises from about 10% to about 30% of the total catalyst weight, the copper base alloy comprising about 50% to about 90% copper.

As hereinbefore set forth, the present invention relates to a process for the alkylation of an alkylatable saturated hydrocarbon with an olefin-acting compound at alkylating conditions in the presence of a catalyst comprising a Friedel-Crafts metal halide and a copper base alloy comprising copper and a metal selected from the group consisting of zinc and tin. Many saturated hydrocarbons are utilizable as starting materials in this process. Preferred saturated hydrocarbons are isoparaffins and naphthenic hydrocarbons containing one or more alkyl groups. Suitable paraffin hydrocarbons include isobutane, isopentane, 2-methylpentane, 3-methylpentane, 2,3-dimethylbutane, 2-methylhexane, 3-methylhexane, 2-methylheptane, 3-methylheptane, etc., and other isoparaffins containing at least one tertiary carbon atom per molecule. Cycloparaffin hydrocarbons suitable as starting materials include methylcyclopentane, methylcyclohexane, etc.

Isobutane is the isoparaffin commonly subjected to alkylation commercially, although higher molecular weight isoparaffins also react with olefin-acting compounds under similar or modified conditions of operation to produce branched chain paraffinic hydrocarbons other than the isoparaffinic hydrocarbons charged to the process. However, as the higher molecular weight isoparaffins such as isopentane, isohexane, etc., are themselves valuable constituents of high anti-knock gasoline, they are consequently less commonly used than isobutane as charge stocks for the alkylation process. Of the various naphthenic hydrocarbons which may be alkylated in the presence of the catalyst described herein to produce naphthenic hydrocarbons of more highly branched chain structure, methylcyclopentane and its alkyl derivatives are commonly employed; however, cyclopentane and cyclohexane and alkyl derivatives of cyclohexane containing at least one tertiary carbon atom per molecule may be utilized to advantage. The resulting alkylates are utilizable as such or as components for high anti-knock gasoline. In the alkylation reaction, normal paraffins such as normal butane, normal pentane, normal hexane, normal heptane, etc., are utilizable to varying extents depending upon the degree of isomerization of the normal paraffinic hydrocarbon prior to the alkylation reaction. Since the catalyst of the present invention is extremely active, such combination isomerization-alkylation reactions are not surprising and are thus within the generally broad scope of this invention.

Suitable alkylating agents which may be charged in this process are olefin-acting compounds including monoolefins, diolefins, polyolefins, also alcohols, ethers, esters, the latter including alkyl halides, alkyl phosphates, certain alkyl sulfates, and also esters of various carboxylic acids. The preferred olefin-acting compounds are olefinic hydrocarbons or olefins comprising monoolefins having one double bond per molecule and polyolefins which have more than one double bond per molecule. Monoolefins which may be utilized for alkylating paraffin hydrocarbons in the presence of the hereinabove described catalyst are either normally gaseous or normally liquid and include ethylene, propylene, 1-butene, 2-butene, isobutene, pentenes, and higher molecular weight normally liquid olefins, the latter including various olefin polymers having from about 6 to about 18 carbon atoms per molecule. Cycloolefins such as cyclohexene, cyclopentene, and various alkyl cycloolefins may also be utilized but generally not under the same conditions of operation applying to the cyclic olefins. The polyolefinic hydrocarbons utilizable in the process of the present invention include conjugated diolefins such as butadiene and isoprene, as well as non-conjugated diolefins and other polyolefinic hydrocarbons containing more than two double bonds per molecule.

Alkylation of the above described alkylatable saturated hydrocarbons may also be effected in the presence of the hereinabove referred to catalyst by reacting such saturated hydrocarbons with certain substances capable of producing olefinic hydrocarbons under the conditions of operation chosen for the process. Such olefin producing substances include alkyl halides capable of undergoing dehydrohalogenation to form olefinic hydrocarbons containing at least two carbon atoms per molecule. The alkyl halides comprise a particularly desirable group of compounds which act as olefins in admixture with alkylatable paraffin hydrocarbons and the catalyst of the present invention, since in the reaction hydrogen halide is produced. Such hydrogen halide is often a desirable component in the process of the present invention, and in some cases is added directly. Also, in other cases, it is desirable to utilize mixtures of the above described olefin-acting compounds and alkyl halides. A specific example of such a mixture is propylene and isopropyl chloride, and a butene and secondary or tertiary butyl chloride. In such a case, olefinic hydrocarbons and the above mentioned olefin producing substances are herein referred to as olefin-acting compounds.

In accordance with the process of the present invention, the alkylation of saturated hydrocarbons to produce hydrocarbons of more highly branched chain structure and of higher molecular weight than the hydrocarbons charged to the process, is effected in the presence of the above indicated catalyst at a temperature of from about −30° C. to about 125° C. or higher, and preferably from about 0° C. to about 75° C., although the exact temperature needed for a particular alkylation reaction will depend upon the specific reactants employed and upon the specific catalyst utilized as well as the respective quantities thereof.

The alkylation reaction is usually carried out at a pressure of from about substantially atmospheric to about 100 atmospheres and preferably under sufficient pressure to maintain the reactants and the products in substantially liquid phase. In the hydrocarbon mixture subjected to alkylation, it is preferable to have present from about two to about ten or more, sometimes up to twenty, and sometimes even up to 100 or more, molecular proportions of alkylatable saturated hydrocarbon for one molecular proportion of olefin-acting compound introduced thereto, particularly olefin hydrocarbon. Higher molecular ratios of alkylatable saturated hydrocarbon to olefin are especially desirable when the process is employed for the alkylation of a high molecular weight olefin boiling generally higher than pentenes, since these olefins frequently undergo depolymerization prior to or substantially simultaneously with alkylation so that one molecular proportion of such an olefin can thus alkylate two or more molecular proportions of alkylatable saturated hydrocarbon. The higher molecular ratios of alkylatable saturated hydrocarbon to olefin also tend to reduce polymerization of the olefin (particularly low molecular weight olefins) and also tend to reduce the formation of poly-alkylated products because of the operation of the law of mass action. In some cases it may be desirable to maintain or employ an atmosphere of hydrogen within the reaction zone, or in some cases it may be desirable to maintain or employ an atmosphere of nitrogen or other inert gas.

In converting saturated hydrocarbons to effect the alkylation thereof with the type of catalysts hereinabove described, either batch or continuous operations may be employed. The actual operation of the process admits of some modification depending on the normal phase of the reacting constituents and whether batch or continuous operations are employed.

In a simple type of batch operation, a paraffin hydrocarbon to be alkylated, such as isobutane, for example, is brought to a temperature within the approximate range specified in the presence of a catalyst comprising a mixture of a Friedel-Crafts metal halide and a copper base alloy comprising copper and a metal selected from the group consisting of zinc and tin, having a concentration corresponding to a sufficient high activity, and alkylation is effected by the gradual introduction under pressure of an olefin, such as 2-butene, in a manner such as to attain contact between the catalyst and the reactants.

In another method of operation, the saturated hydrocarbon may be mixed with an olefin at a suitable temperature, the catalyst, comprising a Friedel-Crafts metal halide, such as aluminum chloride and copper alloyed with a metal selected from the group consisting of zinc and tin, is added and the alkylation reaction is induced by sufficiently long contact with the catalyst. Alkylation may be allowed to progress to different stages depending upon contact time. In the case of the alkylation of isobutane with normally gaseous olefins, the best results from a standpoint of motor fuel production usually are produced by the condensation of equimolar quantities of paraffin hydrocarbons and olefins. After a batch treatment, the hydrocarbons are separated from the catalyst in any suitable manner such as by decantation or quenching with water and the hydrocarbon fraction or layer is then subjected to fractionation for the recovery of an intermediate boiling range hydrocarbon fraction utilizable as a motor fuel.

In one type of continuous operation, a liquid isoparaffin may be charged to a reactor containing a catalyst bed. The olefin-acting compounds may be added to the isoparaffin stream just prior to contact of the stream with the solid catalyst bed, or it may be introduced in multistages at various points in the catalyst bed. It is also within the scope of the present invention to add a hydrogen halide such as hydrogen chloride or hydrogen bromide or an alkyl halide to the process of the present invention, the addition being carried out either continuously or intermittently. In such an operation, the original paraffin hydrocarbon stream such as isobutane may contain sufficient dissolved hydrogen chloride to induce the desired activity of the catalyst comprising aluminum chloride on a copper base alloy support and after this desired catalytic activity has been induced in situ, the parffin hydrocarbon stream can be utilized without prior contacting or combination with hydrogen chloride. As stated hereinabove, instead of hydrogen chloride, an alkyl halide such as isopropylchloride, which undergoes dehydrohalogenation under the conditions of the reaction, may be utilized. The details of continuous processes of this general character are familiar to those skilled in refinery operations and any necessary additions to or modifications from the above description will be more or less obvious and can be made without departing from the generally broad scope of this invention.

The process of the present invention is illustrated by the following examples which are introduced solely for the purpose of illustration and with no intention of unduly limiting the generally broad scope of this invention.

The following examples illustrating the process of this invention are the result of experiments carried out in a once-through bench scale pilot plant in which the reactor was maintained at a pressure of at least 300 pounds per square inch to insure liquid phase operation.

The bench scale pilot plant consisted of a 1″ I.D. stainless steel reactor comprising a 15″ spiral preheater and a 10″ reaction chamber. A blended charge stock was charged to the top of the reactor from a Jerguson type charger by means of a pressure pump. The reactor effluent was passed through a back pressure regulator and thereby reduced to atmospheric pressure. The reactor effluent was then passed to a cold finger stabilizer wherein the liquid product was separated from the unreacted gases which were condensed in a series of two Dry Ice-acetone traps. Any uncondensed gases were measured by a wet test meter.

In all cases the runs were made at a 16 LHSV. A ½ hour pre-run preceded the one hour test run.

*Example I*

The catalyst for this run was prepared by screening brass turnings through a 6-mesh screen, washing said turnings with a solvent and drying for 1 hour at 150°

C. The brass turnings comprise 60.5% copper, 34.9% zinc, .07% tin, and 3.15% lead. Ten grams of anhydrous aluminum chloride were sublimed onto the aforesaid brass turnings by placing the aluminum chloride in a 200 ml. Erlenmeyer flask and adding thereto an upper layer consisting of 100 cc. of brass turnings. A stopper containing a glass tube full of drying agent was then inserted into the flask to maintain a dry atmosphere. The flask was heated, and as the aluminum chloride sublimed, a micro burner was utilized to warm the sides of the flask so that the aluminum chloride did not deposit on the vessel walls. When the sublimation appeared complete the flask was allowed to cool, the contents were mixed by swirling and then heated again in order to insure uniformity. The final weight of the catalyst was 117.3 grams.

The above described catalyst was placed in the catalyst chamber of the reactor of the previously described bench scale pilot plant. 1600 cc. of an isobutane-ethylene blend comprising 8 moles of isobutane per mol of ethylene and containing about 0.2 volume percent of isopropyl chloride as a promoter, was charged to the top of the reactor at an LHSV of 16 for a one hour test period at a pressure of 450 p.s.i. The reaction temperature, measured at the middle of the catalyst bed, lined out at about 84° C.

The reaction product, 92.6 grams of which was liquid, was recovered in the manner above described, the product distribution being as follows:

Products recovered, wt. percent:
   Cond. and non-cond., gas_____ 86.8
   $C_5$–65° C_____ 10.2
   65° C.–140° C_____ 2.6
   140° C.+_____ 0.4
Wt. percent ethylene reacted_____ 97.0
Wt. percent yield: $C_5+$ liquid:
   Prod./ethylene charged_____ 209
Distribution of liquid product fraction:
   IBP–65° C_____ 78.4
   65° C.–140° C_____ 18.6
   140° C.+_____ 3.0
Analysis $C_4$-gas, wt. percent:
   $CH_4$ _____ ---
   $C_2H_4$ _____ ---
   $C_2H_6$ _____ 0.2
   $C_3H_6$ _____ ---
   $C_3H_8$ _____ 0.2
   $C_4H_8$ _____ ---
   $i\text{-}C_4H_{10}$ _____ 95.1
   $n\text{-}C_4H_{10}$ _____ 4.5

Example II

The catalyst for this run was prepared by screening brass turnings through a 6-mesh screen, washing said turnings with a solvent and drying for 1 hour at 150° C. The brass turnings comprise 60.5% copper, 34.9% zinc, .07% tin, and 3.15% lead. 119.3 grams of the brass turnings were added to a rotating flask containing 10.5 grams of anhydrous aluminum chloride. A stopper containing a glass tube full of drying agent was then inserted into the flask to maintain a dry atmosphere. The flask was rotated and heated. As the aluminum chloride sublimed, a micro burner was utilized to warm the sides of the flask so that the aluminum chloride did not deposit on the vessel walls. When sublimation appeared to be complete the flask was cooled. The 119.3 grams of brass turnings charged to the flask had 9.0 grams of aluminum chloride sublimed thereon.

The catalyst was placed in the catalyst chamber of the reactor of the previously described bench scale pilot plant. 1600 cc. of an isobutane-ethylene blend comprising 8 mols of isobutane per mol of ethylene and containing about 0.2 vol. percent of isopropyl chloride as a promoter, was charged to the top of the reactor at an LHSV of 16 for a 1 hour test period at a pressure of 450 p.s.i. The reaction temperature, measured at the middle of the catalyst bed, lined out at about 83° C.

The reaction product, 100.0 grams of which was liquid, was recovered in the manner above described, the product distribution being as follows:

Products recovered, wt. percent:
   Cond. and non-cond. gas_____ 87.2
   $C_5$–65° C_____ 10.0
   65° C.–140° C_____ 1.5
   140° C.+_____ 1.3
Wt. percent ethylene reacted_____ 97.5
Wt. percent yield: $C_5+$ liquid:
   Prod./ethylene charged_____ 175
Distribution of liq. prod. fraction, vol. percent:
   IBP–65° C_____ 80.1
   65° C.–140° C_____ 11.2
   140° C.+_____ 8.6
Analysis $C_4$-gas, wt. percent:
   $CH_4$ _____ ---
   $C_2H_4$ _____ ---
   $C_2H_6$ _____ 0.2
   $C_3H_6$ _____ ---
   $C_3H_8$ _____ ---
   $C_4H_8$ _____ ---
   $i\text{-}C_4H_{10}$ _____ 97.5
   $n\text{-}C_4H_{10}$ _____ 2.3

It is apparent from the foregoing examples of the process of this invention that the alkylation reaction is effected quite readily. Examination of the product distribution reveals negligible formation of propane and of liquid boiling above 140° C. which indicates that the reaction products are substantially free of the complex hydrocarbons generally referred to as sludge.

Example III

This example is presented to illustrate the advantage of the catalyst of the present invention in relation to a Friedel-Crafts metal halide on an inert support. For this purpose 61.5 g. of aluminum chloride was sublimed onto 89.6 g. of ⅛″ glass beads under anhydrous conditions. This catalyst was tested in the bench scale apparatus of the prior examples under the same conditions of operation. The reaction product was recovered in the same manner. In this instance a noticeable amount of sludge settled out in the cold finger stabilizer and the liquid product was decanted therefrom. The product distribution, exclusive of the sludge, is as follows:

Products recovered, wt. percent:
   Cond. and non-cond. gas_____ 93.6
   $C_5$–65° C_____ 4.3
   65° C.–140° C_____ 2.1
   140° C.+_____ 0.0
Wt. percent ethylene reacted_____ 72.2
Wt. percent yield: $C_5+$ liquid:
   Prod./ethylene charged_____ 88
Distribution of liquid prod. fraction:
   IBP–65° C_____ 69.7
   65° C.–140° C_____ 30.3
   140° C.+_____ 0.0
Analysis $C_4$-gas, wt. percent:
   $CH_4$ _____ ---
   $C_2H_4$ _____ ---
   $C_2H_6$ _____ 2.1
   $C_3H_6$ _____ ---
   $C_3H_8$ _____ ---
   $C_4H_8$ _____ ---
   $i\text{-}C_4H_{10}$ _____ 95.7
   $n\text{-}C_4H_{10}$ _____ 2.2

It will be noted that in addition to the sludge formation the liquid product recovery is about one half that of the previous examples. Further the amount of ethylene which has reacted is considerably less. In addition the liquid product distribution indicates that the preferred alkylation takes place to a considerably lesser degree.

I claim as my invention:

1. A process for the alkylation of an alkylatable saturated hydrocarbon which comprises reacting the latter with an olefin-acting compound at alkylation conditions in the presence of a Friedel-Crafts metal halide and a copper base alloy comprising copper and a metal selected from the group consisting of zinc and tin.

2. A process for the alkylation of an alkylatable paraffin hydrocarbon which comprises reacting the latter with an olefin-acting compound at alkylation conditions in the presence of a Friedel-Crafts metal halide and a copper base alloy comprising copper and a metal selected from the group consisting of zinc and tin.

3. A process for the alkylation of an alkylatable cycloparaffin hydrocarbon which comprises reacting the latter with an olefin-acting compound at alkylation conditions in the presence of a Friedel-Crafts metal halide and a copper base alloy comprising copper and a metal selected from the group consisting of zinc and tin.

4. A process for the alkylation of an alkylatable isoparaffin which comprises reacting the latter with an olefin-acting compound at alkylation conditions in the presence of a Friedel-Crafts metal halide and a copper base alloy comprising copper and a metal selected from the group consisting of zinc and tin.

5. A process for the alkylation of an alkylatable isoparaffin which comprises reacting the latter with an olefin-acting compound at alkylation conditions in the presence of aluminum chloride and a copper base alloy comprising copper and a metal selected from the group consisting of zinc and tin.

6. A process for the alkylation of an alkylatable isoparaffin which comprises reacting the latter with an olefin at alkylation conditions in the presence of aluminum chloride and a copper base alloy comprising copper and a metal selected from the group consisting of zinc and tin.

7. A process for the alkylation of isobutane which comprises reacting the latter with an olefin at alkylation conditions in the presence of aluminum chloride and a copper base alloy comprising copper and a metal selected from the group consisting of zinc and tin.

8. A process for the alkylation of isobutane which comprises reacting the latter with an olefin-acting compound at alkylation conditions in the presence of aluminum chloride and a copper base alloy comprising copper and zinc.

9. A process for the alkylation of isobutane which comprises reacting the latter with an olefin at alkylation conditions in the presence of aluminum chloride and a copper base alloy comprising copper and zinc.

10. A process for the alkylation of isobutane which comprises reacting the latter with an olefin-acting compound at alkylation conditions in the presence of aluminum chloride and a copper base alloy comprising copper and tin.

11. A process for the alkylation of isobutane which comprises reacting the latter with an olefin at alkylation conditions in the presence of aluminum chloride and a copper base alloy comprising copper and tin.

12. A process for the alkylation of isobutane which comprises reacting the latter with an olefin-acting compound at alkylation conditions in the presence of aluminum chloride and a brass support.

13. A process for the alkylation of isobutane which comprises reacting the latter with an olefin at alkylation conditions in the presence of aluminum chloride and a brass support.

14. A process for the alkylation of isobutane which comprises reacting the latter with an olefin-acting compound at alkylation conditions in the presence of aluminum chloride and a bronze support.

15. A process for the alkylation of isobutane which comprises reacting the latter with an olefin at alkylation conditions in the presence of aluminum chloride and a bronze support.

16. A process for the alkylation of isobutane which comprises reacting the latter with ethylene at alkylation conditions in the presence of aluminum chloride and a brass support.

17. A process for the alkylation of isobutane which comprises reacting the latter with propene at alkylation conditions in the presence of aluminum chloride and a bronze support.

18. A process for the alkylation of isobutane which comprises reacting the latter with 2-butene at alkylation conditions in the presence of aluminum chloride and a brass support.

19. A process for the alkylation of isobutane which comprises reacting the latter with 1-butene at alkylation conditions in the presence of aluminum chloride and a brass support.

20. A process for the alkylation of isobutane which comprises reacting the latter with iso-butene at alkylation conditions in the presence of aluminum chloride and a brass support.

References Cited in the file of this patent

UNITED STATES PATENTS

| | | |
|---|---|---|
| 2,265,548 | Schuit | Dec. 9, 1941 |
| 2,277,512 | De Simo et al. | Mar. 24, 1942 |
| 2,903,490 | Appell | Sept. 8, 1959 |
| 2,925,447 | Appell | Feb. 16, 1960 |